United States Patent
Douglas et al.

(10) Patent No.: US 8,078,029 B2
(45) Date of Patent: Dec. 13, 2011

(54) CABLE MANAGEMENT PANEL WITH SLIDING DRAWER AND METHODS

(75) Inventors: Joel B. Douglas, Hutchinson, MN (US); Kathleen M. Barnes, Champlin, MN (US); Michael J. Franklin, Apple Valley, MN (US); Lonnie E. Hannah, Monticello, MN (US); Trevor D. Smith, St. Louis Park, MN (US); Steven P. Trebesch, Eagan, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 157 days.

(21) Appl. No.: 12/655,363

(22) Filed: Dec. 28, 2009

(65) Prior Publication Data
US 2010/0202744 A1 Aug. 12, 2010

Related U.S. Application Data

(63) Continuation of application No. 12/316,799, filed on Dec. 15, 2008, now Pat. No. 7,664,362, which is a continuation of application No. 12/148,142, filed on Apr. 15, 2008, now Pat. No. 7,480,438, which is a continuation of application No. 11/799,010, filed on Apr. 30, 2007, now Pat. No. 7,373,071, which is a continuation of application No. 11/349,687, filed on Feb. 8, 2006, now Pat. No. 7,231,125, which is a continuation of application No. 09/900,465, filed on Jul. 6, 2001, now Pat. No. 7,079,744.

(51) Int. Cl.
G02B 6/00 (2006.01)

(52) U.S. Cl. .................................... 385/135; 385/134

(58) Field of Classification Search .......... 385/134–137, 385/147; 174/50, 52.1
See application file for complete search history.

(56) References Cited

U.S. PATENT DOCUMENTS

| | | |
|---|---|---|
| 4,373,776 A | 2/1983 | Purdy |
| 4,792,203 A | 12/1988 | Nelson |
| 4,820,007 A | 4/1989 | Ross et al. |
| 4,840,449 A | 6/1989 | Ghandeharizadeh |
| 4,898,448 A | 2/1990 | Cooper |
| 4,995,688 A | 2/1991 | Anton et al. |
| 5,066,149 A | 11/1991 | Wheeler et al. |
| 5,142,607 A | 8/1992 | Petrotta et al. |
| 5,209,572 A | 5/1993 | Jordan |
| 5,240,209 A | 8/1993 | Kutsch |

(Continued)

FOREIGN PATENT DOCUMENTS
DE 37 04 560 A1 8/1988
(Continued)

*Primary Examiner* — Kevin S Wood
(74) *Attorney, Agent, or Firm* — Merchant & Gould P.C.

(57) ABSTRACT

An optical fiber cable management panel includes drawer assemblies, each including a drawer slidable within a chassis. The drawer assemblies are secured together by a bracket that includes an interlock arrangement with the chassis. Such an interlock arrangement includes a non-threaded stud engaging a hole. Radius limiters may be part of the drawer assembly and include a cable entry aperture have a closed perimeter and a flared cable guide surface around most of, and preferably all of, the closed perimeter to allow for the entry of cables from all directions. A control mechanism controls movement of the radius limiter relative to the drawer assembly. The control mechanism includes a rotating member that has an axis of rotation transverse to the slidable motion of the radius limiter and normal to the radius limiter.

11 Claims, 13 Drawing Sheets

U.S. PATENT DOCUMENTS

| | | | |
|---|---|---|---|
| 5,247,603 A | 9/1993 | Vidacovich et al. | |
| 5,323,480 A | 6/1994 | Mullaney et al. | |
| 5,339,379 A | 8/1994 | Kutsch et al. | |
| 5,363,466 A | 11/1994 | Milanowski et al. | |
| 5,497,444 A | 3/1996 | Wheeler | |
| 5,511,144 A | 4/1996 | Hawkins et al. | |
| 5,640,481 A | 6/1997 | Llewellyn et al. | |
| 5,802,237 A | 9/1998 | Pulido | |
| 5,887,106 A | 3/1999 | Cheeseman et al. | |
| 5,917,984 A | 6/1999 | Röseler et al. | |
| 5,946,440 A | 8/1999 | Puetz | |
| 6,009,224 A | 12/1999 | Allen | |
| 6,044,194 A | 3/2000 | Meyerhoefer | |
| 6,226,436 B1 | 5/2001 | Daoud et al. | |
| 6,236,795 B1 | 5/2001 | Rodgers | |
| 6,271,476 B1 | 8/2001 | Bobowick et al. | |
| 6,278,830 B1 | 8/2001 | Levesque et al. | |
| 6,307,999 B1 | 10/2001 | Daoud | |
| 6,321,017 B1 | 11/2001 | Janus et al. | |
| 6,351,591 B1 | 2/2002 | Daoud | |
| 6,396,989 B1 | 5/2002 | Johnston et al. | |
| 6,438,310 B1 | 8/2002 | Lance et al. | |
| 6,504,988 B1 | 1/2003 | Trebesch et al. | |
| 6,668,123 B1 | 12/2003 | Ellison et al. | |
| 6,715,619 B2 | 4/2004 | Kim et al. | |
| 6,748,155 B2 | 6/2004 | Kim et al. | |
| 6,865,331 B2 | 3/2005 | Mertesdorf | |
| 6,937,807 B2 | 8/2005 | Franklin et al. | |
| 6,968,111 B2 | 11/2005 | Trebesch et al. | |
| 7,079,744 B2 | 7/2006 | Douglas et al. | |
| 7,120,348 B2 | 10/2006 | Trebesch et al. | |
| 7,171,099 B2 * | 1/2007 | Barnes et al. | 385/135 |
| 7,231,125 B2 | 6/2007 | Douglas et al. | |
| 7,302,154 B2 | 11/2007 | Trebesch et al. | |
| 7,308,184 B2 | 12/2007 | Barnes et al. | |
| 7,373,071 B2 | 5/2008 | Douglas et al. | |
| 7,463,811 B2 * | 12/2008 | Trebesch et al. | 385/135 |
| 7,480,438 B2 | 1/2009 | Douglas et al. | |
| 7,499,623 B2 * | 3/2009 | Barnes et al. | 385/135 |
| 7,599,599 B2 * | 10/2009 | Herzog et al. | 385/135 |
| 7,664,362 B2 | 2/2010 | Douglas et al. | |
| 7,764,859 B2 * | 7/2010 | Krampotich et al. | 385/135 |
| 7,876,993 B2 * | 1/2011 | Krampotich et al. | 385/135 |
| 2002/0054747 A1 | 5/2002 | Foley | |
| 2009/0226142 A1 | 9/2009 | Barnes et al. | |

FOREIGN PATENT DOCUMENTS

| | | |
|---|---|---|
| DE | 299 00 087 U1 | 5/1999 |
| EP | 0 645 657 A1 | 9/1994 |
| WO | WO95/07480 | 3/1995 |
| WO | WO96/10203 | 4/1996 |
| WO | WO 98/41891 | 9/1998 |
| WO | WO 99/47960 | 9/1999 |
| WO | WO 99/47961 | 9/1999 |

* cited by examiner

CABLE MANAGEMENT PANEL WITH SLIDING DRAWER AND METHODS

CROSS-REFERENCE TO RELATED APPLICATIONS

This application is a continuation of application Ser. No. 12/316,799, filed Dec. 15, 2008, now U.S. Pat. No. 7,664,362; which is a continuation of application Ser. No. 12/148,142, filed Apr. 15, 2008, now U.S. Pat. No. 7,480,438; which is a continuation of application Ser. No. 11/799,010, filed Apr. 30, 2007, now U.S. Pat. No. 7,373,071; which is a continuation of application Ser. No. 11/349,687, filed Feb. 8, 2006, now U.S. Pat. No. 7,231,125; which is a continuation of application Ser. No. 09/900,465, filed Jul. 6, 2001, now U.S. Pat. No. 7,079,744; which applications are incorporated herein by reference.

TECHNICAL FIELD

This disclosure concerns management of optical fiber cables. In particular, this disclosure relates to storage of optical fiber cables and devices in the telecommunications industry.

BACKGROUND OF THE INVENTION

Cable termination, splice, and storage devices are known including, for example, devices shown in U.S. Pat. Nos. 4,792,203 and 5,946,440, both assigned to ADC Telecommunications, Inc. Both of these patents concern devices with movable trays for storage and management of the optical fiber cables. U.S. Pat. No. 5,066,149, also assigned to ADC Telecommunications, concerns a cable management device including slidable drawers, each including a cable slack take-up mechanism. When moving the trays or drawers, unnecessary or excessive displacement of the optical fiber cables is undesirable. As the optical fiber cables are displaced, they are subject to bending and other forces. Bending of the fibers can cause attenuation and loss of signal strength. As the fiber bends, the fiber can also break, resulting in a loss of transmission through the fiber. Improvements are desirable.

SUMMARY OF THE INVENTION

In one aspect, the disclosure describes a radius limiter for an optical fiber cable management panel. The radius limiter includes a frame piece having a vertically oriented curved wall and a trough section adjacent to the curved wall. A cover member is oriented at least partially over the trough section. The cover member and the frame piece define a cable entry aperture having a closed perimeter. The cable entry aperture is in communication with the trough section to permit cables to enter through the aperture and rest within the trough section. Further, at least 75% of the perimeter of the cable entry aperture is circumscribed by a flared cable guide surface.

A method of limiting a radius of optical fiber cables is provided and includes directing optical fiber cables through a cable entry aperture and against a flared cable guide surface of a cover. The cover is oriented at least partially over a trough section of a frame piece that is part of a radius limiter.

In another aspect, this disclosure concerns an optical fiber cable management system including at least first and second drawer assemblies. Each of the drawer assemblies includes a chassis and a drawer slidably mounted within the chassis. A mounting bracket is provided to connect together the first drawer assembly and the second drawer assembly through an interlock arrangement. The mounting bracket also is usable to connect together more than two drawer assemblies. The interlock arrangement includes non-threaded stud members and holes sized for receiving the non-threaded stud members.

A method of connecting a first drawer assembly to a second drawer assembly includes securing a bracket to the chassis of the first drawer assembly and the chassis of the second drawer assembly by inserting a non-threaded stud arrangement into an aperture arrangement.

In another aspect, this disclosure is directed to an optical fiber cable management panel including a drawer assembly, including a drawer slidably mounted within a chassis, a cable radius limiter slidably mounted relative to the drawer assembly, and a control mechanism secured to the drawer assembly to synchronize slidable movement of the cable radius limiter relative to slidable movement of the drawer within the chassis. The control mechanism includes a rotating member oriented to rotate between the drawer and the chassis. The rotating member has an axis of rotation that is transverse to a direction of slidable movement of the cable radius limiter.

A method for controlling slidable movement of a cable radius limiter relative to slidable movement of a drawer within a chassis includes rotating a wheel, secured to the cable radius limiter, between the drawer and the chassis. The wheel has an axis of rotation that is oriented normally to the cable radius limiter.

DETAILED DESCRIPTION OF THE PREFERRED EMBODIMENT

Figure 1:
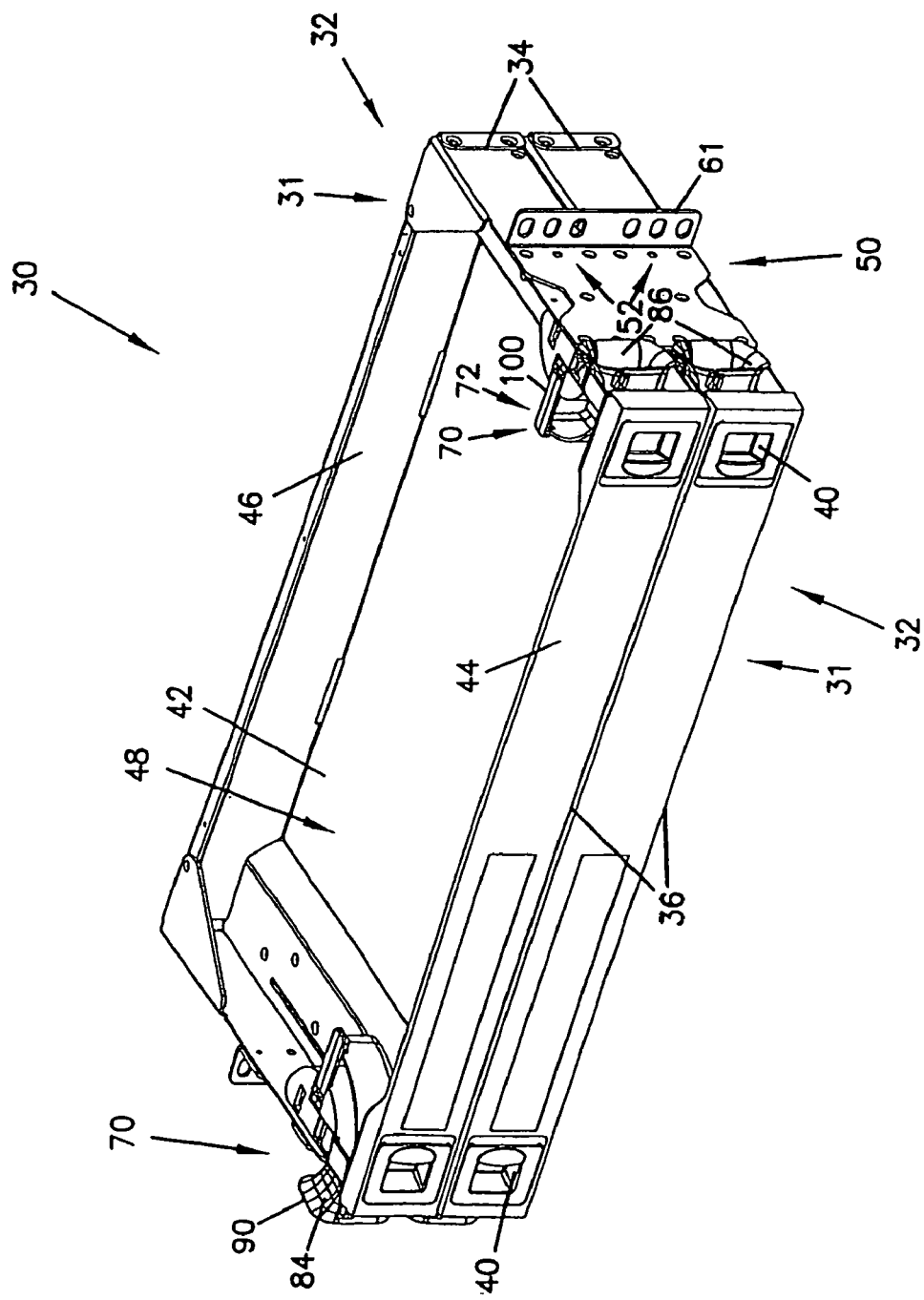
FIG. 1 is a perspective view of a cable management panel, depicting two drawers and without tray inserts.

A cable management panel or module is depicted in FIG. 1 generally at 30. In the one shown, the panel 30 includes a plurality of drawer assemblies 32. In the one shown in FIG. 1, the panel 30 includes two drawer assemblies 32. Each of the drawer assemblies 32 includes a chassis 34 and a drawer 36 slidably mounted within the chassis 34.

Each drawer 36 may include cable management structure, for example, devices for storing the cables or connecting the cables to other cables or fiber optic devices, such as attenuators, couplers, switches, wave division multiplexers, splitters or splices. Drawers 36 are slidable relative to chassis 34 by way of two drawer slides 38 on opposite sides of the chassis 34. Each drawer 36 includes two latches 40 to secure the drawer 36 in a closed position (the position shown in FIG. 1).

Each drawer 36 includes a base 42, a front wall 44 and a rear wall 46. Note that the drawer 36 is absent of side walls, or is "side wall-free." This structure allows for cable entry and exit and prevents cable damage during sliding movement of the drawers 36 when accessing the cables and connectors or other devices in the drawer 36. The base 42, front wall 44 and rear wall 46 together define a storage interior 48 for holding and storing the cables.

Figure 12:
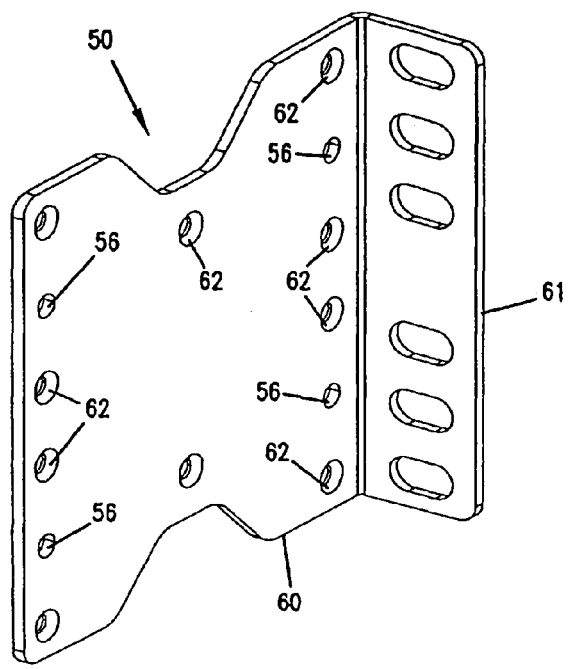
FIG. 12 is a perspective view of a bracket utilized to secure together the drawers of the cable management panel depicted in FIGS. 1 and 10.

Each storage interior 48 is sized for receiving cable management and/or distribution structures. When the drawer 36 is in the closed position, the cables and management or distribution structures in the storage interior 48 are protected. In preferred embodiments, the distribution structures can be conveniently mounted on a tray insert that drops into the storage interior 48. This allows for convenient structuring of the drawer 36 to serve one or more desired functions in the panel 30. Examples of tray inserts are described in co-pending and commonly assigned U.S. patent application Ser. No. 09/649,398, which is a continuation-in-part of application Ser. No. 09/490,379 (also co-pending and commonly assigned), each of which is incorporated by reference herein. In the preferred embodiment illustrated, each of the drawers 36 is constructed to be stackable and linkable to form sub-cable management panels 31. Such modularity also allows for ease of use for a variety of different needs for the cable management system. As can be seen in FIG. 1, a bracket 50 is used to link each of the drawer assemblies 32 together. A perspective view of one preferred embodiment of the bracket 50 is illustrated in FIG. 12

In prior arrangements, mounting brackets were attached to the side chassis with each drawer with several screws, for example, #4-40 UNC screws. It was found that if drawers connected together in this manner were dropped, the bracket would become loose from the drawers, leading to wobble between drawers in a multiple drawer assembly. Further, when the drawers would be opened, there sometimes would be rubbing and scraping if the drawers were loose from the bracket. The bracket 50, as described herein, addresses these problems.

In particular, the mounting bracket 50 connects together each of the drawer assemblies 32 through an interlock arrangement 52. In preferred embodiments, the interlock arrangement 52 includes at least one, and preferably a plurality, of non-threaded stud members 54 located in one of the mounting bracket 50 and the chassis 34. Further, the interlock arrangement 52 includes at least one, and preferably a plurality, of apertures or holes 56 sized for receiving the non-threaded stud members 54. The plurality of holes 56 are defined by the other of the mounting bracket 50 and the chassis 34.

Figure 10:
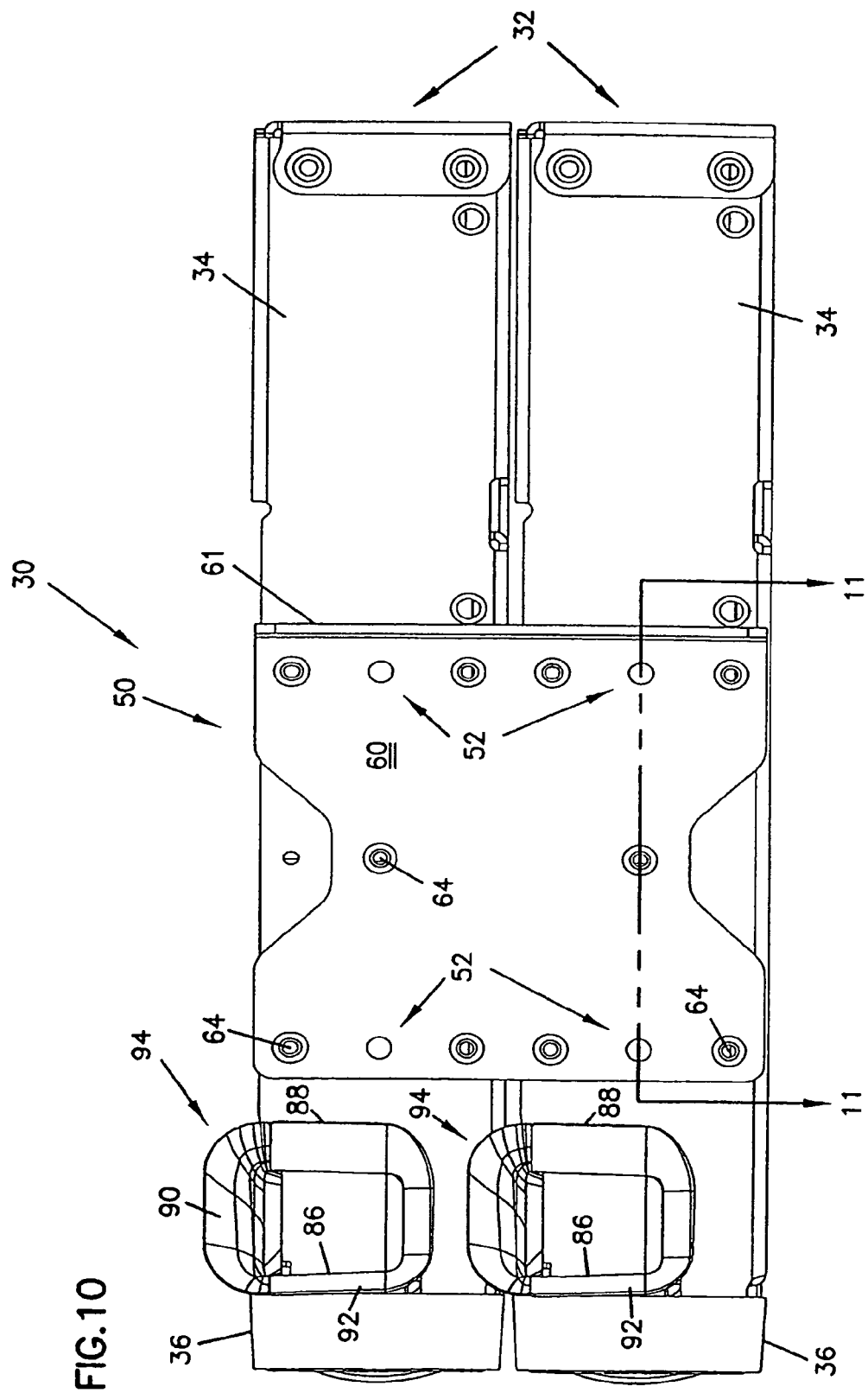
FIG. 10 is a side elevational view of the cable management panel depicted in FIG. 1.
Figure 13:
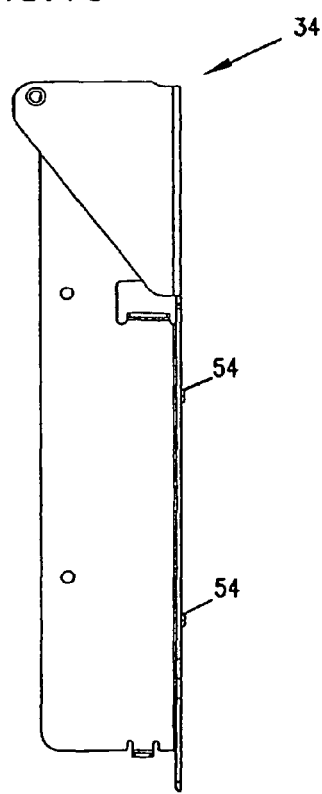
FIG. 13 is a top plan view of a chassis that is part of a drawer assembly utilized in the cable management panel depicted in FIG. 1.
Figure 14:
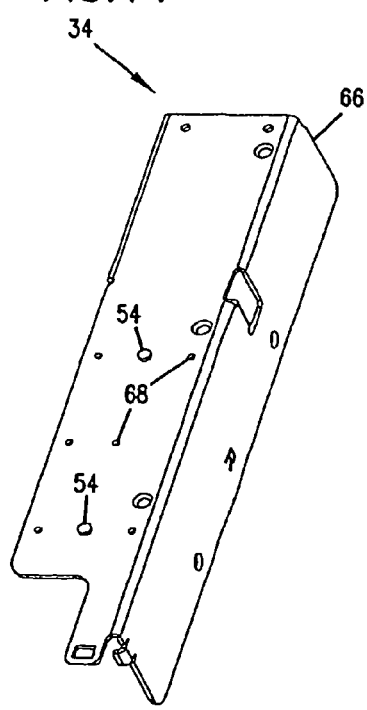
FIG. 14 is a perspective view of the chassis of FIG. 13.

In the particular embodiment illustrated, the interlock arrangement 52 includes two non-threaded stud members 54 projecting from the chassis 34 (see FIGS. 13-14). The stud members 54 may be formed from the chassis 34 itself (by punching or forming), or may be independent members permanently secured to the chassis 34. In this illustrated embodiment, the interlock arrangement 54 includes at least 4 holes being defined by the mounting bracket 50, receiving each of the non-threaded stud members 54 of each of the chassis 34. These holes 56 are visible in FIGS. 10 and 12.

In general, the bracket 50 includes first and second mounting plates 60, 61 arranged generally orthogonal to each other. The first mounting plate 60 is utilized for securing each of the chassis 34 together. The second mounting plate 61 is used to mount each of the drawer assemblies 32 together along other framework, typically together with other cable management panels 30. Each of the holes 56 is defined by and extends completely through the first mounting plate 60. The first mounting plate 60 also includes several more holes 62 for accommodating screws 64, as used in prior arrangements, to help secure each of the drawer assemblies 32 together to the bracket 50.

The chassis 34 is illustrated in FIGS. 13 and 14. It can be seen that each chassis generally is an L-shaped frame piece 66 and, in addition to the non-threaded studs 54 projecting from the frame piece 66, defines a plurality of holes 68 for accommodating the screws 64.

Figure 11:
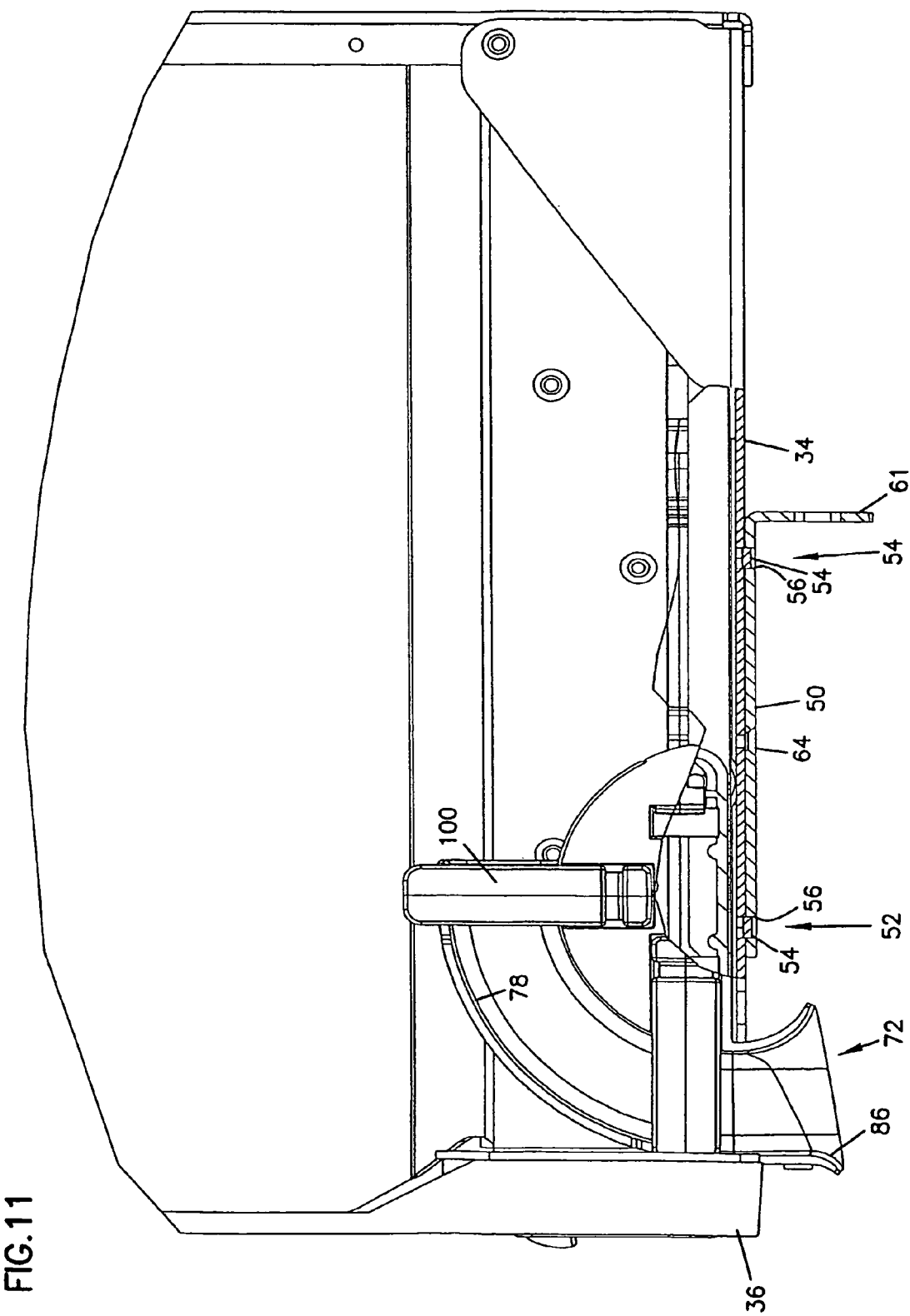
FIG. 11 is a schematic, partially cross-sectional view of the cable management panel depicted in FIG. 1, the cross-section being taken along the line 11-11 of FIG. 10.

FIG. 11 is a cross-sectional view illustrating the bracket 50 secured to one of the chassis 34. Two of the studs 54 can be seen in cross-section extending through two of the holes 56. This interlock arrangement 52 provides the cable management panel 30 with more strength and rigidity than prior arrangements that utilized screws. The interlock arrangement 52 helps to absorb the impact and thrust loading created by a drop scenario, by vibration, or by an earthquake.

While non-threaded stud members 54 are illustrated in the preferred embodiment, it should be understood that, in alternate arrangements, pins may also be used. Further, in other embodiments, the interlock arrangement 52 may include a tab/slot arrangement, where a tab projects into and is bent over a slot.

Figure 2:
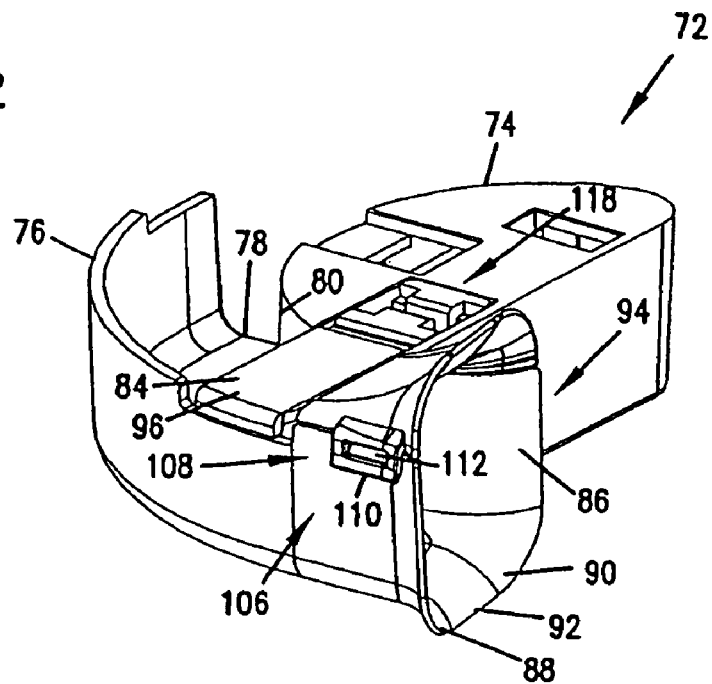
FIG. 2 is a perspective view of a radius limiter utilized in the cable management panel depicted in FIG. 1.
Figure 6:
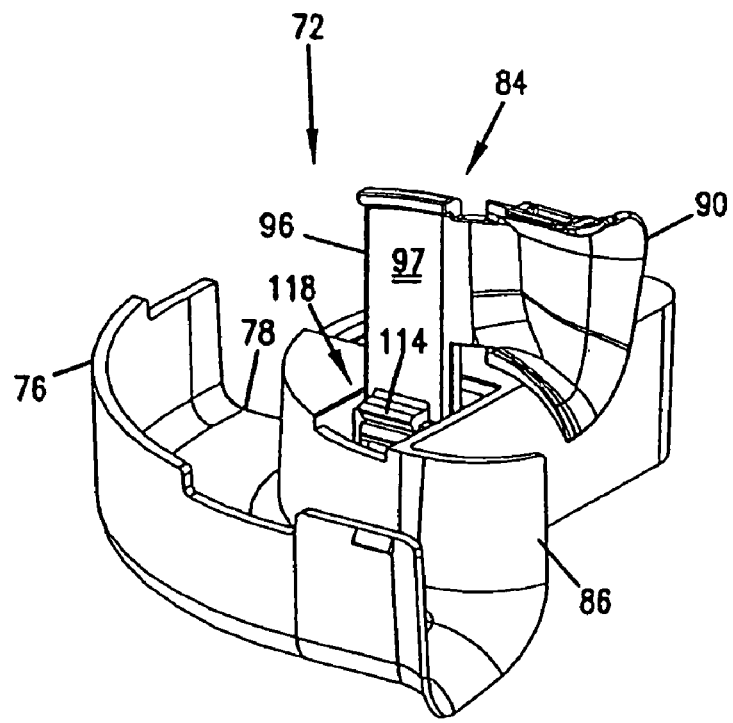
FIG. 6 is a perspective view of a cover utilized on the radius limiter of FIG. 2 and showing a cover on the radius limiter pivoted to allow access to a trough in the radius limiter.
Figure 3:
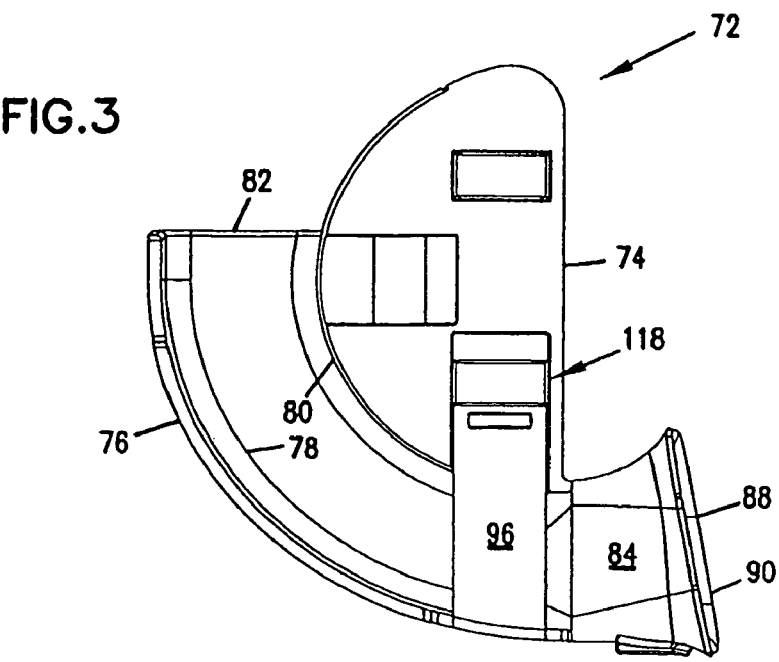
FIG. 3 is a top plan view of the radius limiter depicted in FIG. 2.

Preferably, each of the drawer assemblies 32 includes a take-up mechanism 70 to manage optical fibers entering and exiting the cable management panel 30. In the preferred embodiment illustrated, each take-up mechanism 70 includes a push member or radius limiter 72. In reference now to FIG. 2, one preferred embodiment of radius limiter 72 is illustrated in perspective view. In the preferred one shown, the radius limiter 72 includes a frame piece 74. The frame piece 74 includes a vertically oriented curved wall 76 and a trough section 78 adjacent to the vertically curved wall 76. In particular, the trough section 78 is defined by a second vertically oriented wall 80 and a base 82 that bridges the vertically oriented wall 80 and the curved wall 76 (see FIG. 3). As can be seen in FIGS. 2 and 3, the curved wall 76 is concavely shaped relative to the trough section 78. As can also be seen in FIG. 3, the trough section 78 also has a curved shape. In preferred embodiments, the curved shape of the trough section 78 is on a radius of about 1.25-2 in.

Still in reference to FIG. 2, the preferred radius limiter 72 shown includes a cover member 84. Preferably, the cover member 84 is oriented at least partially over the trough section 78. The cover member 84 and the frame piece 74 define a cable entry aperture 86 that is in communication with the trough section 78 to permit cables to enter through the aperture 86 and rest within the trough section 78.

The cable entry aperture 86 defines a closed perimeter 88. By "closed perimeter", it is meant that the border that forms the aperture 86 is at least 90%, preferably 100%, closed to form a continuous, uninterrupted boundary. In the preferred embodiment illustrated, at least 75%, preferably at least 95%, and in most preferred embodiments, 100% of the perimeter 88 of the cable entry aperture 86 is circumscribed by a flared cable guide surface 90. The flared cable guide surface 90 preferably takes the form of a smooth, contour 92, such that the cable entry aperture 86 has the appearance of a trumpet flare or a bell-mouth 94. The smooth contour 92 preferably is bent on a radius of about 0.25-0.75 in. The flared cable guide surface 90 helps to protect cables entering the cable entry aperture 86 and prevents such cables from bending too sharply and possibly losing some light transmission.

Figure 5:
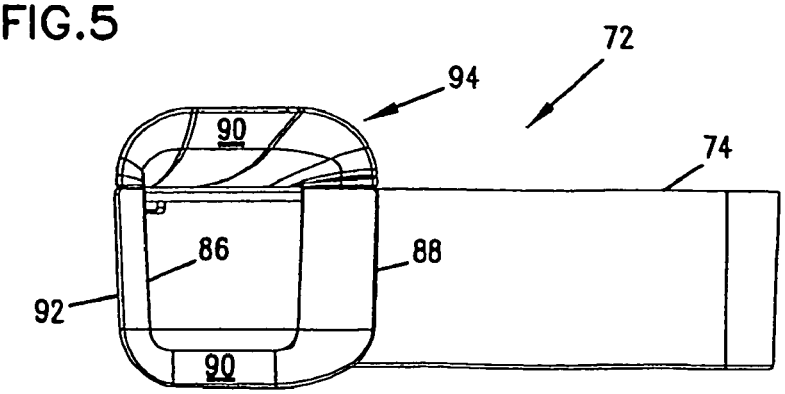
FIG. 5 is a right side elevational view of the radius limiter depicted in FIG. 2.
Figure 7:
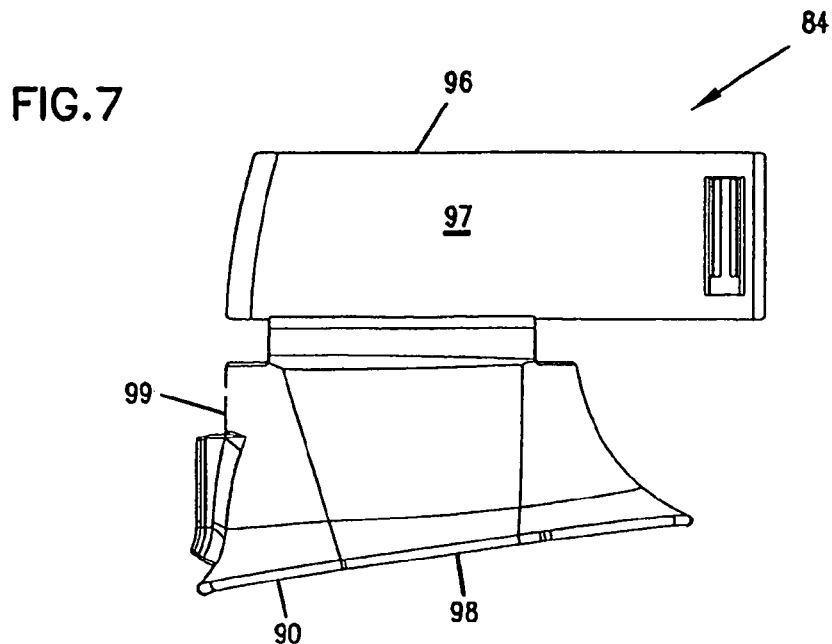
FIG. 7 is a top plan view of a cover for the radius limiter depicted in FIG. 2.
Figure 8:
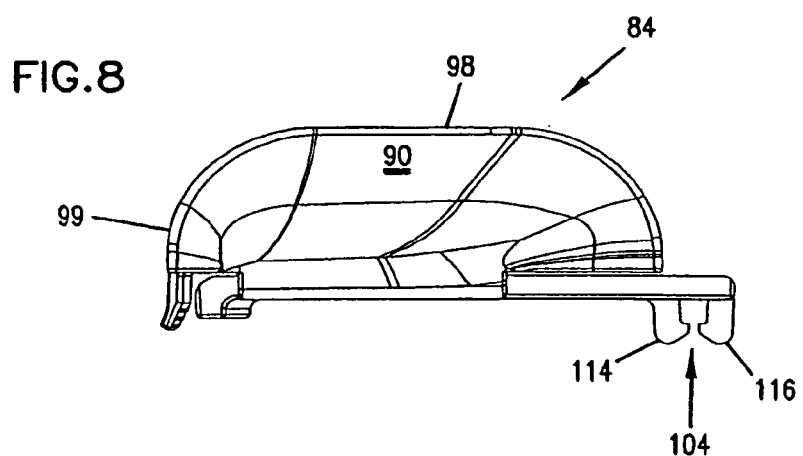
FIG. 8 is a front elevational view of the cover depicted in FIG. 7.
Figure 9:
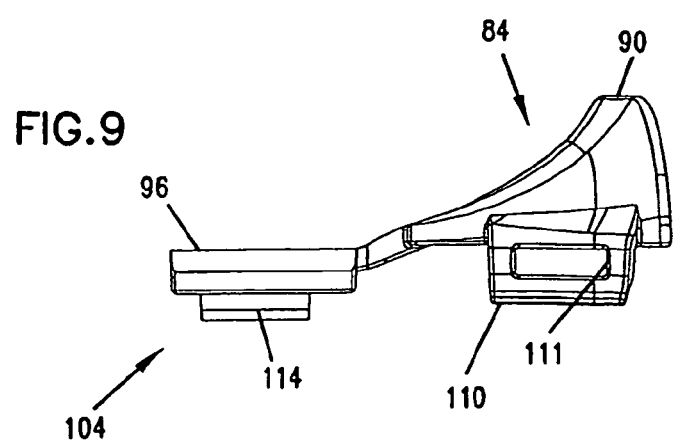
FIG. 9 is a right elevational view of the cover depicted in FIG. 7.

As can be seen particularly in FIGS. 2 and 5, the preferred embodiment has the entire perimeter 88 of the cable entry aperture 86 to include the flared cable guide surface 90. When shaped in this manner, the cable entry aperture 86 protects cables entering from any direction, including from a direction vertically above the radius limiter 72.

Figure 4:
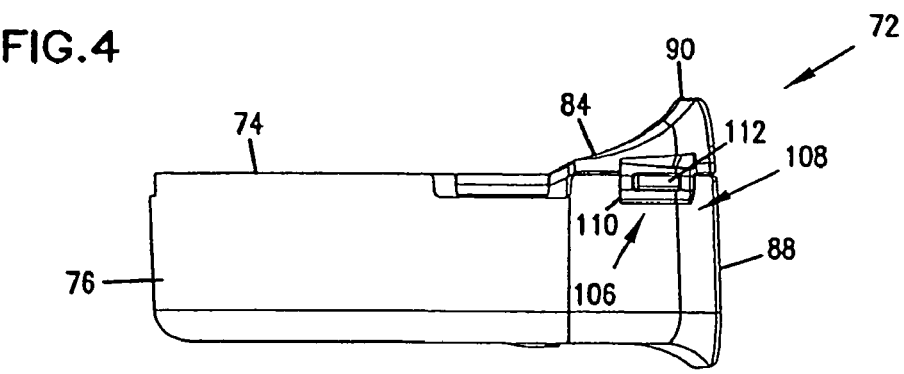
FIG. 4 is a front elevational view of the radius limiter depicted in FIG. 2.

In reference now to FIGS. 6-9, features of the cover member 84 are defined. Preferably, the cover member 84 includes a finger 96. The finger 96 includes an extension 97 that defines a first free edge 98 and a second free edge 99. A stem 102 extends between the extension 97 and an attachment portion 104. As can be seen in FIGS. 6-9, the first free edge 98 defines a portion of the flared guide surface 90. The second free edge 99 selectively engages the vertically oriented wall 76 of the frame piece 74 through a latch arrangement 106 (FIGS. 2 and 4). Preferably, the latch arrangement 106 includes a hook and projection arrangement 108, where a hook from one of the finger 96 and frame piece 74 engages a projection from the other of the finger 96 and frame piece 74. In the particular arrangement illustrated, the latch arrangement 106 includes the finger 96 having a hook 110 defining an aperture 111, through which a projection 112 extending or projecting from the vertically oriented curved wall 76 of the frame piece 74 is defined. As can be appreciated, the latch arrangement 106 permits the finger 96 to be releasably secured to the frame piece 74. Together with the attachment portion 104, explained below, this latch arrangement 106 permits the finger 96 to be selectively moved from, and pivoted at the attachment portion 104, from the frame piece 74 to permit the installation of cables through the cable entry aperture 86 and into the trough section 78.

The attachment portion 104 helps to pivotally secure the finger 96 to the frame piece 74. In reference to FIGS. 6 and 8, in the preferred embodiment, the attachment portion 104 includes a pair of extruding tabs 114, 116, projecting from the extension 97. The tabs 114, 116 are snapped around a member 75 within the frame piece 74 of the radius limiter 72 in a manner which allows the frame piece 74 to securely hold the finger 96 and permit the finger 96 to be selectively pivoted away from and then back toward the trough section 78 (see FIG. 6), along a hinge point 118.

The latch arrangement 106 provides for a secure interlock between the finger 96 and the frame piece 74 to prevent unintended bending away of the finger 96 from the frame piece 74 if fibers or cables tend to pull it up during manipulation of the drawer assembly 32. In preferred embodiments, the hinge point 118 permits selective lifting of the cover member 84 away from remaining portions of the radius limiter 72 to facilitate fiber loading.

Figure 18:
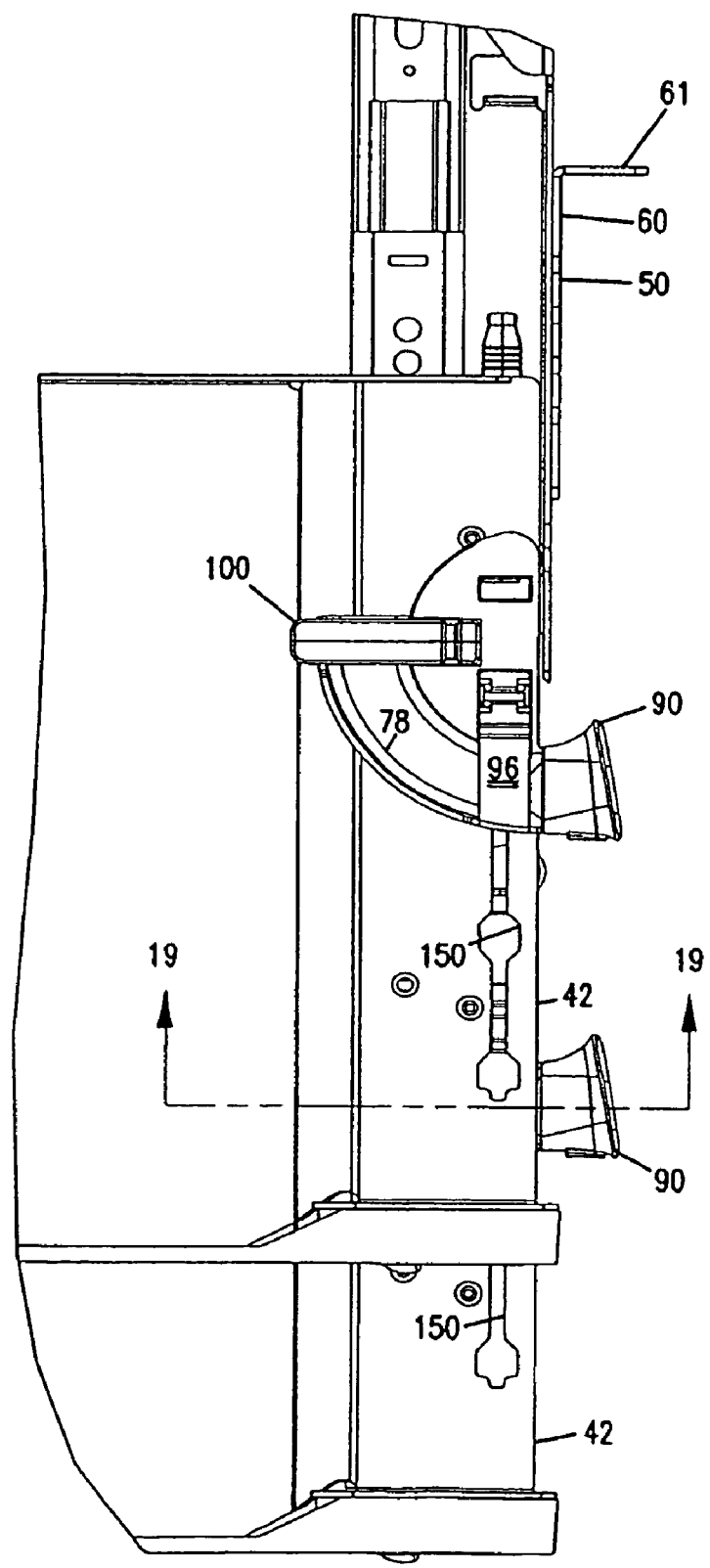
FIG. 18 is a top plan view of the cable management panel depicted in FIG. 15.
Figure 19:
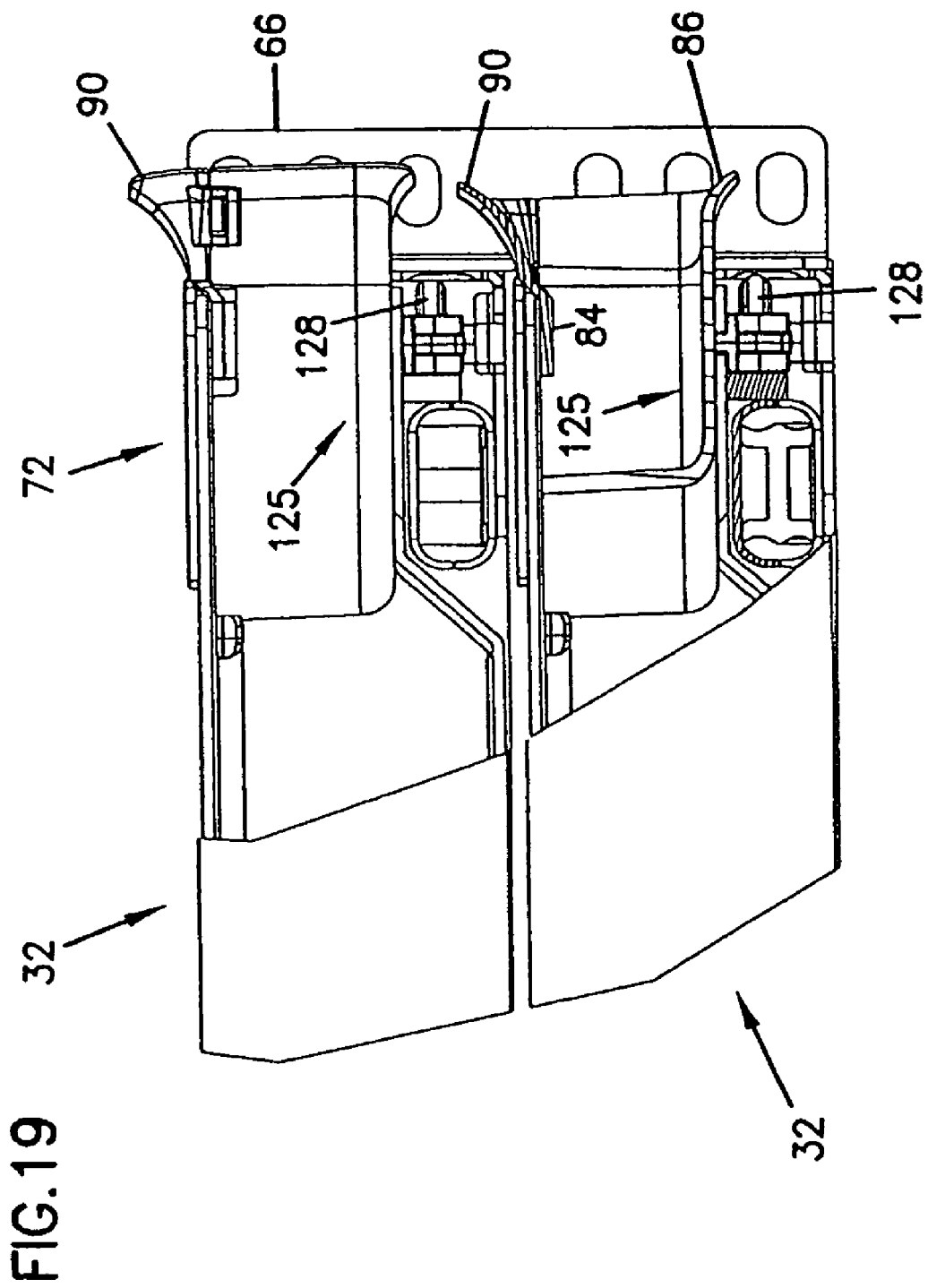
FIG. 19 is a schematic, cross-sectional view of the cable management panel taken along the line 19-19 of FIG. 18.

The cover member 84 may also include a second finger 100 (FIGS. 11 and 18). Finger 100, in the one shown, is oriented generally at a right angle to the finger 96 and is pivotally mounted relative to the frame 74. Finger 100 also helps to hold the cables in place within the radius limiter 72.

To load cable or fiber into the radius limiter 72, the latch arrangement 106 is released to allow the finger 96 to be moved relative to the frame 74. The finger 96 is pivoted about the hinge point 118 that defines a gap or space through which the cable may enter. If present, the second finger 100 is also pivoted away from the frame 74. The cable is then oriented and rested within the trough section 78. The finger 96 is again oriented against the frame piece 74 to close the gap or space, and the latch arrangement 106 is secured by having the projection 112 extend into the aperture 111 of the hook 110. If present, the second finger 100 is returned against the frame 74. If cable is being directed from a position above the radius limiter 72, the cable is resting against the flared cable guide surface 90 defined by the first free edge 98 of the finger 96. As described above, the flared cable guide surface 90 helps to prevent the cable from bending too sharply. Further, as explained above, the shape of the trough section 78 also controls the radius of the cable and prevents it from bending too sharply.

The radius limiter 72 is preferably slidably mounted relative to the drawer assembly 32. Movement of the radius limiter 72 is controlled with synchronized movement with the drawer 36 to ensure that the cables do not bend too sharply when the drawer 36 is being opened or closed relative to the chassis 34. If the cables were bent too sharply, this may cause loss of signal strength or loss of transmission. Preferably, the cable management panel 30 includes a control mechanism 125 (FIGS. 15-19) that is secured to the drawer assembly 32 to synchronize slidable movement of the cable radius limiter 72 relative to slidable movement of the drawer 36 within the chassis 34. In particular, the control mechanism 125 includes a rotating member 126, such as a roller or wheel 128. Preferred wheels 128 will include a compressible ring 129 (FIG. 17) that circumscribes the wheel 128 to help provide for a smooth interface and introduce some friction for smooth operation.

Figure 16:
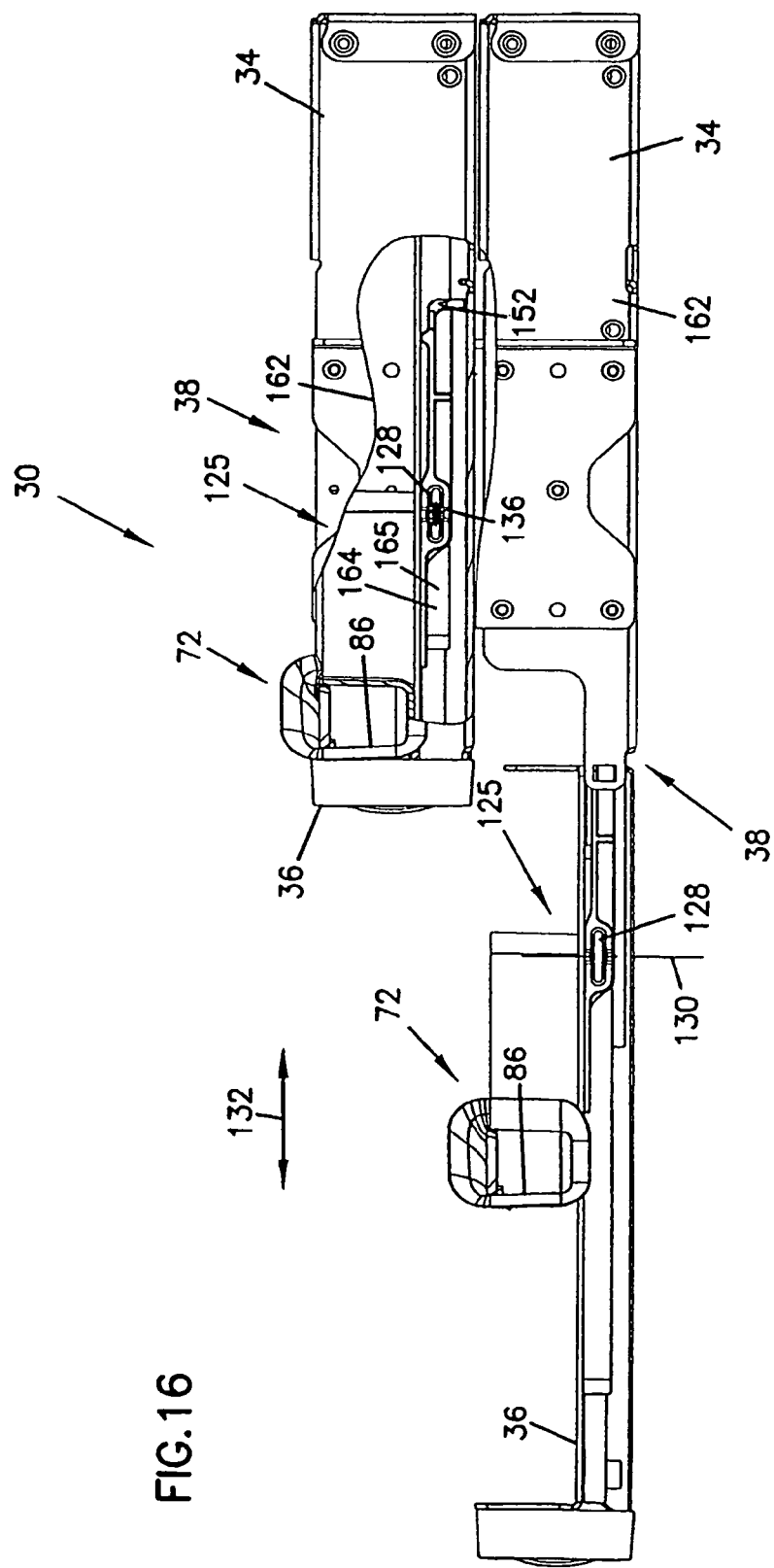
FIG. 16 is a side elevational view of the cable management panel depicted in FIG. 15, and with a portion broken away to show internal components.

Preferably, the wheel 128 is oriented to rotate between the drawer 36 and the chassis 34. In most preferred embodiments, the wheel 128 has an axis of rotation 130 that is transverse to a direction of slidable movement of the cable radius limiter 72. This is illustrated in FIG. 16. In FIG. 16, the direction of slidable movement of the cable radius limiter 72 is shown at arrow 132. In the particular orientation shown in FIG. 16, this direction 132 is a horizontal direction. It is also the direction that corresponds to the slidable motion of the drawer 36 relative to the chassis 34. The axis of rotation 130 extends, in the particular orientation shown in FIG. 16, in a vertical direction, that is, the direction transverse to the direction 132 of slidable movement of the radius limiter 72. Also, in the example illustrated, the axis of rotation 130 is normal (i.e., perpendicular) to the radius limiter 72. By having the wheel 128 rotate about axis 130, which is a direction transverse to the motion of the radius limiter 72 and normal to the radius limiter 72, there is a reduction in problems associated with assembly during manufacturing. For example, in previous arrangements, the wheel was oriented to have an axis of rotation that extended parallel to the radius limiter 72. In these prior arrangements, sheet metal flatness and parallelism had to be carefully controlled because it was critical to wheel engagement. Further, in these previous systems when the wheel had an axis of rotation that was parallel to the radius limiter, there was an issue with respect to tolerance stack up. Further, in prior systems, the wheels would push the drawer and its components upwards towards the drawer cover due to the orientation of the wheel, which sometimes caused interference problems. By orienting the wheel 128 with the axis of rotation 130 in the direction normal to the radius limiter, many of these problems are addressed or eliminated all together.

Figure 20:
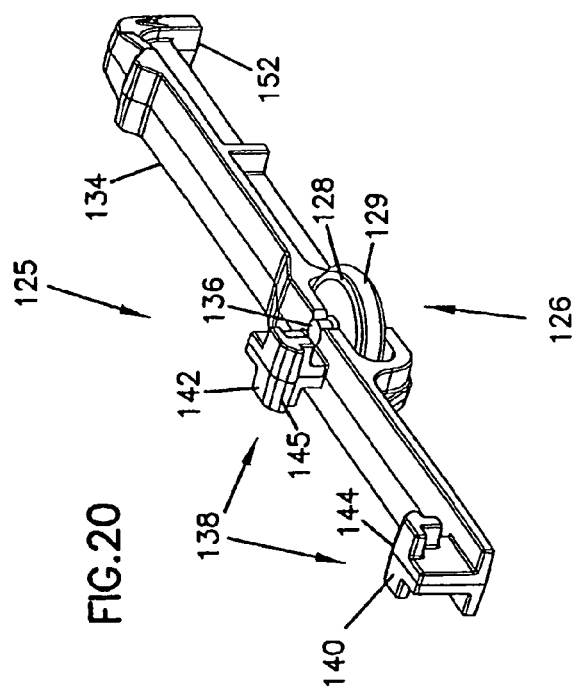
FIG. 20 is a perspective view of a wheel bracket utilized in the cable management panel depicted in FIGS. 1 and 15-19.
Figure 21:
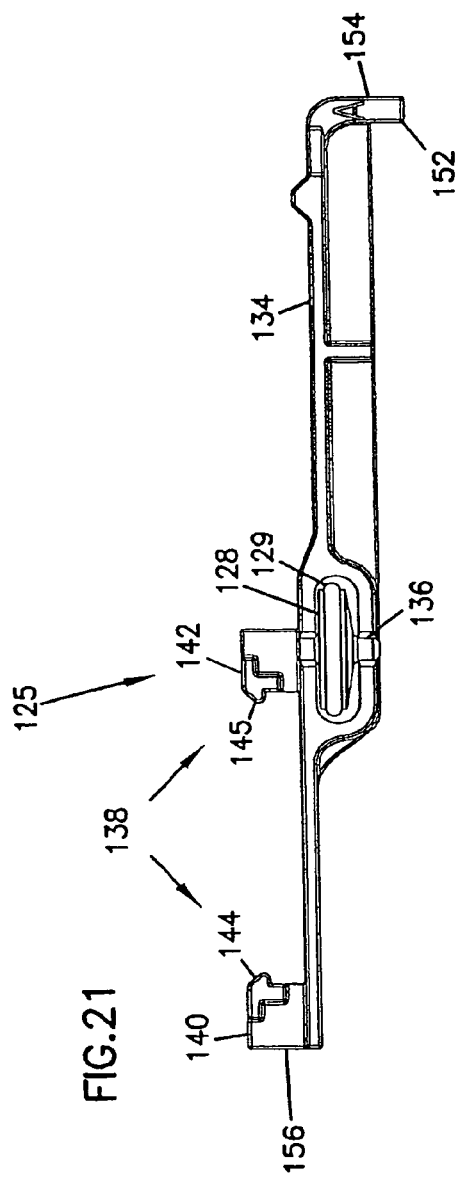
FIG. 21 is a side elevational view of the wheel bracket depicted in FIG. 20.

In reference now to FIGS. 20-21, in preferred embodiments, the control mechanism 125 includes a bracket 134 having an axle 136. As can be seen in FIGS. 20 and 21, the wheel 128 is mounted for rotation on the axle 136. The axle 136 is co-linear with and defines the axis of rotation 130.

Still in reference to FIGS. 20-21, the preferred bracket 134 shown includes a projection arrangement 138 that allows the bracket 134 to be secured to the cable radius limiter 72. In particular, the projection arrangement 138 includes a first projection 140 and a second projection 142. Each of the first projection 140 and second projection 142 includes a tab 144, 145 that extends or projects into and locks with a suitable receiving aperture 146, 147 (FIG. 17) in the frame piece 74 of the radius limiter 72. In this manner, the bracket 134 can be secured to the radius limiter 72, and through an elongated slot 150 defined by the base 42 of the drawer 36. The slot 150 allows for assembly of the radius limiter 72 to the drawer 36.

The bracket 134 also includes a catch 152 projecting from a side and in a direction opposite to the direction that the projection arrangement 138 projects. In the one shown, the catch 152 defines one end 154 of the bracket 134. Also, in the particular embodiment illustrated, the first projection 140 forms an opposite end 156 of the bracket 134. The catch 152 is selectively engaged with a stop member 158 on the chassis 34. The catch 152 of the bracket 134 selectively engages the stop member 158 when the drawer 36 and the radius limiter 72 are slid relative to the chassis 34. This engagement prevents the drawer 36 from being totally separated from the chassis 34 when sliding the drawer 36 from the chassis 34.

In reference again to FIG. 17, the chassis 34 was described above as being an L-shaped frame piece 66. In particular, the L-shaped frame piece 66 includes a base 160 that is located in a plane generally parallel to the base 42 of the drawer, when the drawer assembly 32 is in operable assembly, and a side wall 162 extending normal to the chassis base 160. This side wall 162 provides one of the surfaces against which the wheel 128 rotates.

Figure 15:
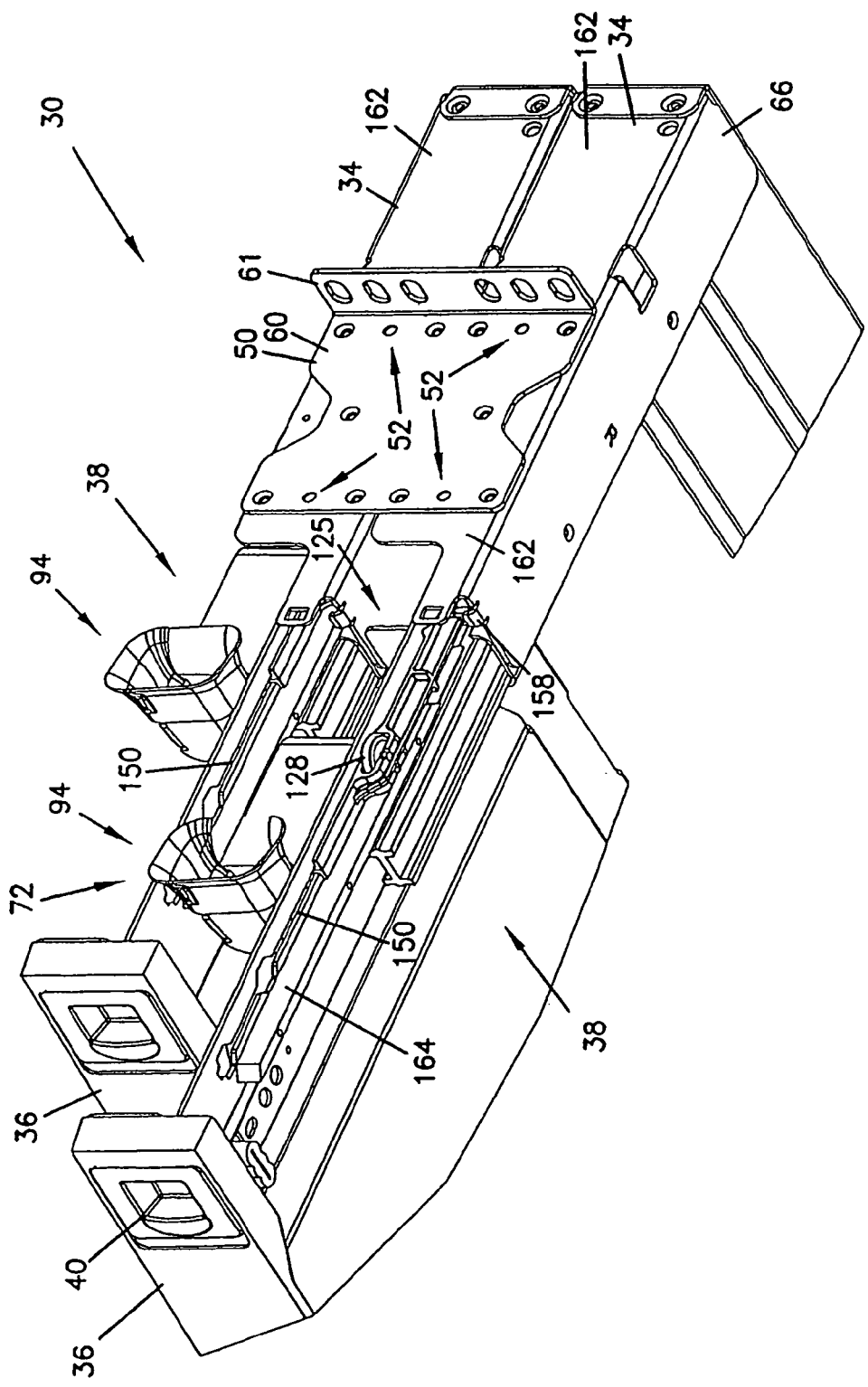
FIG. 15 is a perspective view of the cable management panel depicted in FIG. 1, and with one of the drawers in a fully open position and with one drawer in a partially open position.
Figure 17:
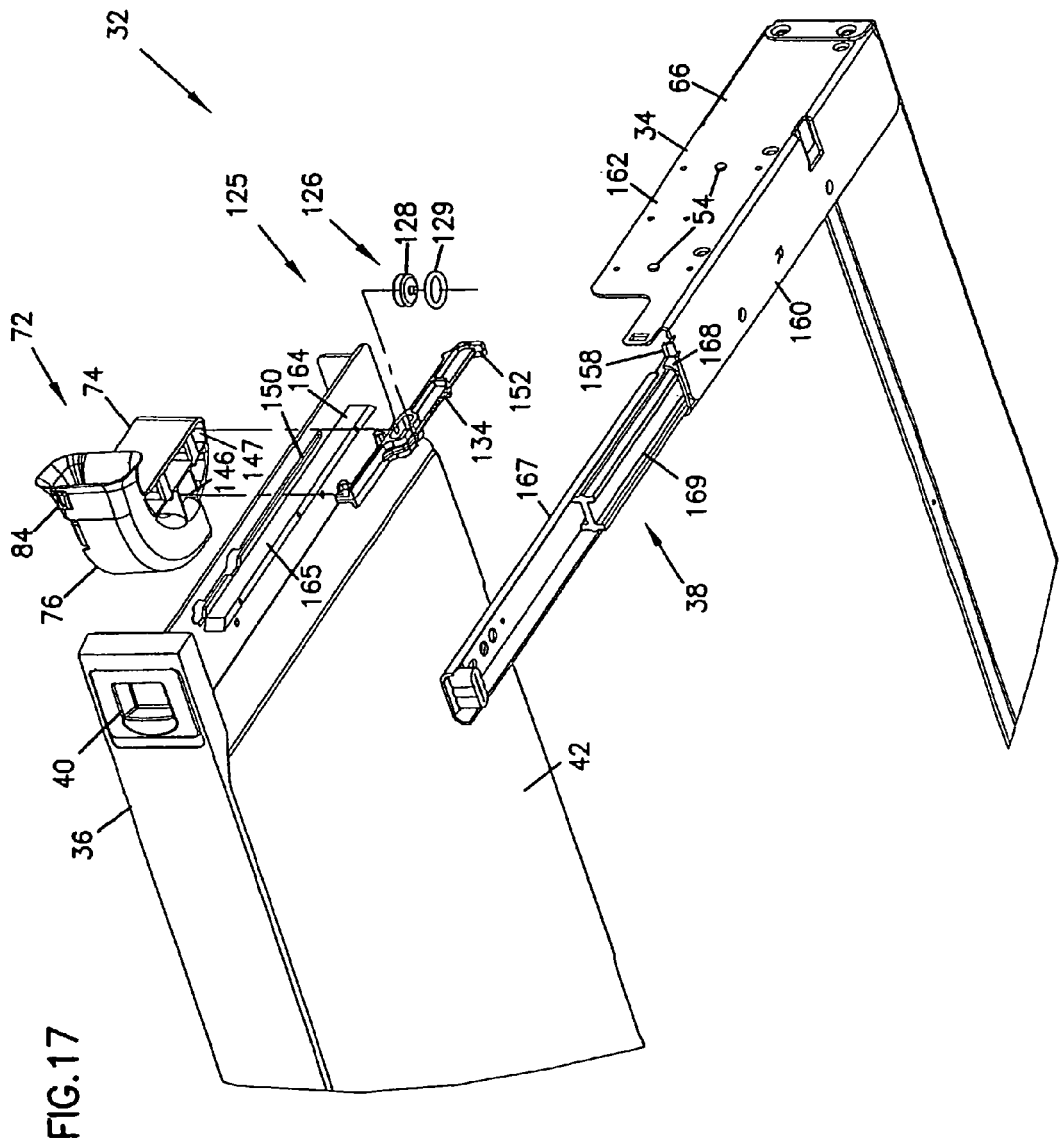
FIG. 17 is an exploded, perspective view of one of the drawer assemblies depicted in FIG. 15.

Secured to the drawer 36 is a wheel guide 164. The wheel guide 164 is a generally elongated structural member defining a smooth guide surface 165. As can be seen in FIGS. 15 and 17, the wheel guide 164 is adjacent to and generally parallel to the elongated slot 150 in the drawer 36.

In operable assembly, the wheel 128 rotates about its axle 136 between and against the guide surface 165 of the wheel guide 164 and the chassis side wall 162. The location of the wheel 128 secured to the radius limiter 72 and between the drawer 36 and chassis 34 allows the radius limiter 72 to move at one-half of the speed of the movement of the drawer 36 relative to the chassis 34.

In reference again to FIG. 17, and as mentioned above, each of the drawer assemblies 32 preferably includes drawer slide 38. The drawer slide 38 is the type of slide that is described in U.S. Pat. No. 5,209,572, which is incorporated by reference herein. In general, the drawer slide 38 includes symmetrically identical outside channel members 167, 168 for securing to the drawer 36 and chassis 34, respectively. An inner retainer 169 slidably retains ball bearings (not shown) that are trapped between the channel members 168, 169. In operation, when the drawer 36 is moved relative to the chassis 34, the channel member 167 slides relative to the channel member 168 with the ball bearings rotating between the retainer 169 and the channel members 167, 168 to help create smooth, slidable motion.

When the drawer 36 is slid relative to the chassis 34, the wheel 128 is rotated between the drawer 36 and chassis 34 (in particular, between the wheel guide 164 and the side wall 162 of the chassis 34), and the wheel 128 is rotated about the axis of rotation 130 that is transverse to the direction of slidable movement of the cable radius limiter 72, and that is oriented normally to the radius limiter 72.

The above specification provides a complete description of example embodiments of the invention. Many embodiments of the invention can be made, according to principles described herein.

We claim:

1. A method of assembling a cable management panel, the method comprising the steps of:
   a) providing a chassis, a drawer that slides relative to the chassis, and a control mechanism interconnected between the chassis and the drawer; and
   b) mounting a radius limiter to the control mechanism, the radius limiter including a curved cable trough with a trough entry having a closed, flared perimeter, the control mechanism providing synchronized movement of the radius limiter relative to the drawer;
   c) wherein the step of mounting the radius limiter to the control mechanism includes orienting the radius limiter such that the trough entry of the curved cable trough is located toward a lateral side of the drawer and such that the curved cable trough directs cabling routed within the trough toward an interior of the drawer.

2. The method of claim 1, further including attaching a hinged cover to the curved cable trough so as to capture cabling routed within the curved cable trough of the radius limiter, the hinged cover partly defining the closed, flared perimeter of the trough entry.

3. The method of claim 2, wherein the step of attaching the hinged cover includes snap-fitting the hinged cover to the curved cable trough.

4. The method of claim 1, further including providing a mounting bracket for mounting the cable management panel to a frame, the mounting bracket having an interlock arrangement that connects together the chassis of the cable management panel with another chassis of another cable management panel.

5. The method of claim 1, wherein the step of providing the control mechanism includes providing the control mechanism having a horizontal wheel that defines a vertical axis of rotation.

6. The method of claim 5, further including interconnecting the control mechanism between the chassis and the drawer such that the horizontal wheel contacts a sidewall of the chassis and contacts a surface of the drawer to provide the synchronized movement of the radius limiter relative to the drawer.

7. The method of claim 1, further including interconnecting the control mechanism between the chassis and the drawer such that a wheel of the control mechanism contacts a sidewall of the chassis and contacts a surface of the drawer to provide the synchronized movement of the radius limiter relative to the drawer.

8. The method of claim 1, wherein the step of orienting the radius limiter includes orienting the radius limiter such that the trough entry of the curved cable trough is located toward a lateral, sidewall-free side of the drawer.

9. The method of claim 1, wherein the step of mounting the radius limiter to the control mechanism, includes mounting the radius limiter to a projection arrangement provided on an elongated bracket of the control mechanism.

10. The method of claim 1, further including providing a stop arrangement that prevents sliding separation of the drawer from the chassis.

11. The method of claim 10, wherein the step of providing the stop arrangement includes providing a catch on the control mechanism that engages a stop member provided on the chassis.

* * * * *